United States Patent [19]

Dalziel et al.

[11] Patent Number: 4,477,851
[45] Date of Patent: Oct. 16, 1984

[54] MAGNETIC DATA STORAGE AND DRIVE APPARATUS

[75] Inventors: Warren L. Dalziel, Monte Sereno; Charles D. Flanigan, San Jose; John J. Lynott, Los Gatos, all of Calif.

[73] Assignee: Microtek Storage Corporation, San Jose, Calif.

[21] Appl. No.: 386,048

[22] Filed: Jun. 7, 1982

[51] Int. Cl.³ .................... G11B 5/008; G11B 23/02; G03B 1/56; B65H 17/46
[52] U.S. Cl. .................................... 360/95; 242/195; 226/91; 360/132
[58] Field of Search ............... 360/95, 93, 85, 132, 360/99; 242/60, 181, 195, 55.19 A, 188; 226/91, 92

[56] References Cited

U.S. PATENT DOCUMENTS

| | | | |
|---|---|---|---|
| 3,664,607 | 5/1972 | Trefzger | 242/195 |
| 3,797,776 | 3/1974 | Umeda | 242/188 |
| 3,980,254 | 9/1976 | Coon | 242/195 |
| 4,334,656 | 6/1982 | Crawford | 226/92 |
| 4,383,660 | 5/1983 | Richard | 360/95 |

*Primary Examiner*—Robert Martin Kilgore
*Attorney, Agent, or Firm*—Hamrick, Hoffman, Guillot & Kazubowski

[57] ABSTRACT

A magnetic tape storage and drive apparatus in which the tape stored in the cartridge has a ferrule means attached to the lead end of the tape. The associated drive means includes a leader and threading apparatus for the tape and is used with a pair of spherical recording heads and pressure pads to eliminate the need for accurate tape tension control means.

10 Claims, 13 Drawing Figures

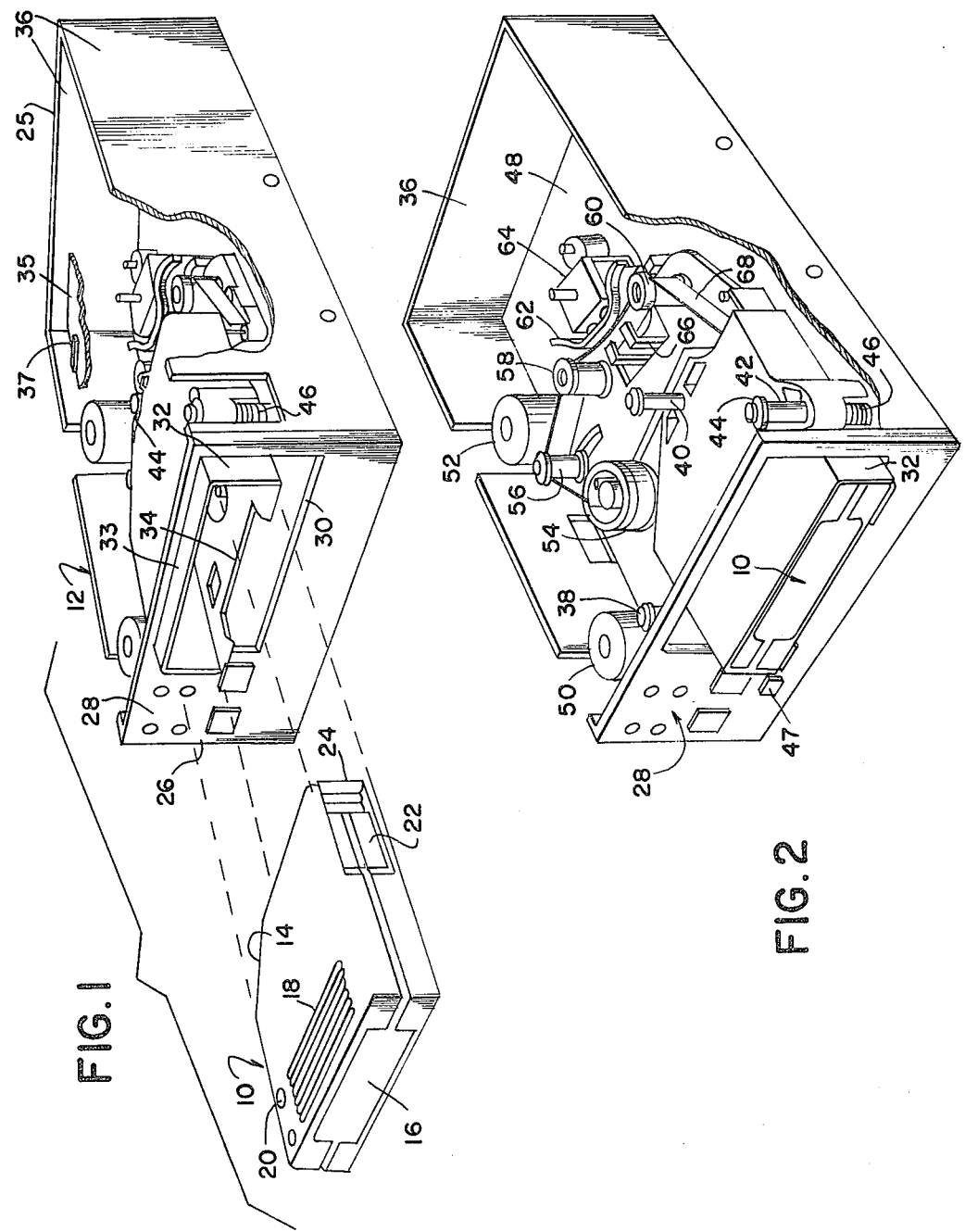

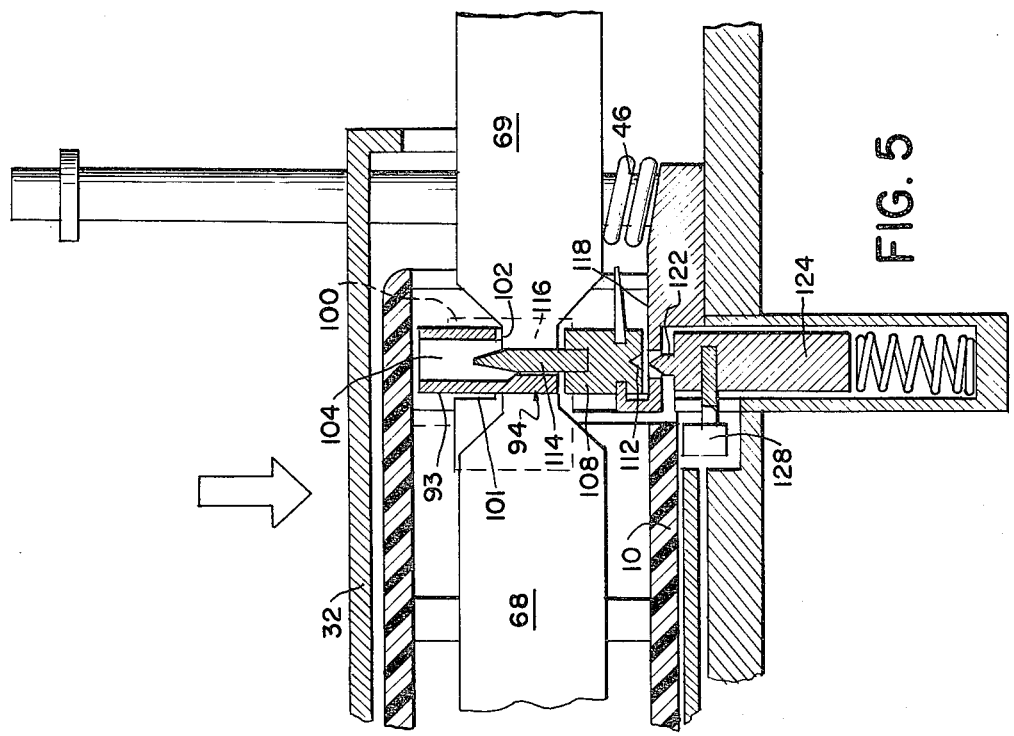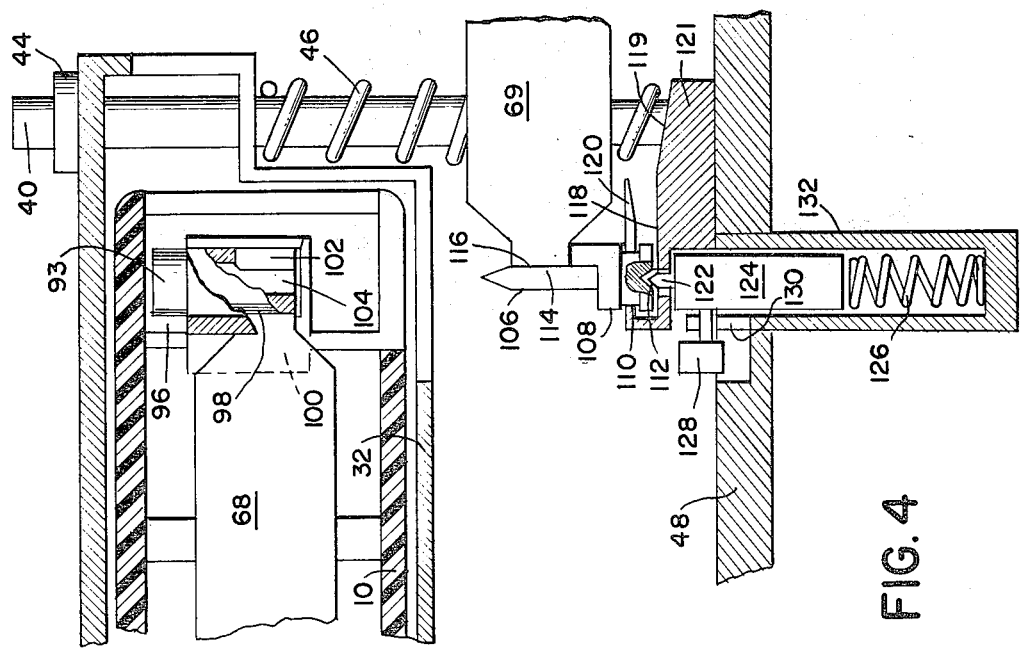

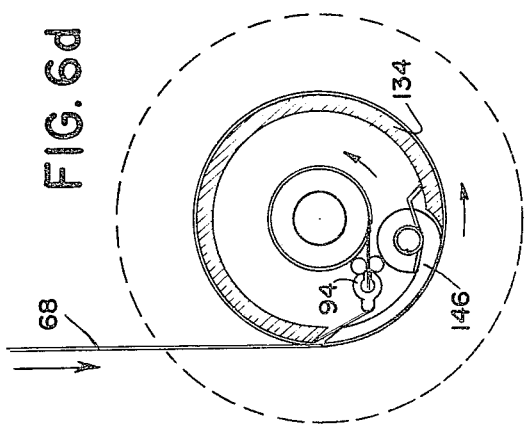
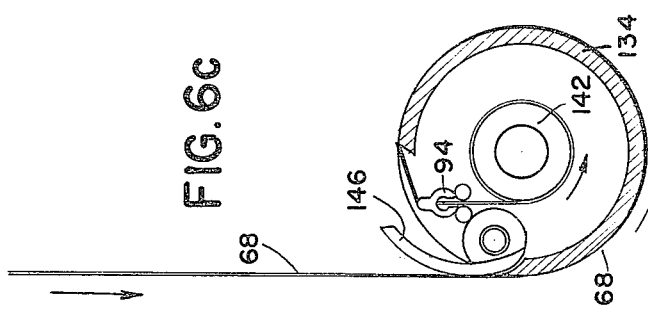
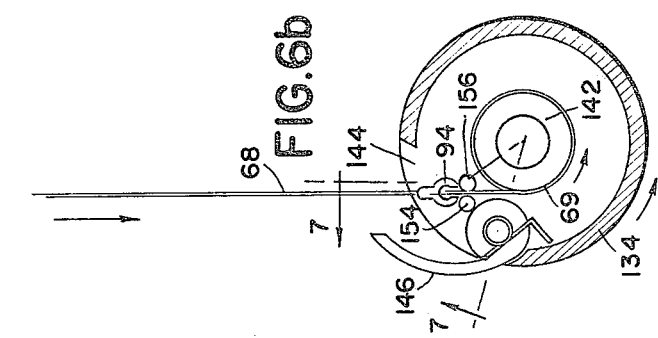
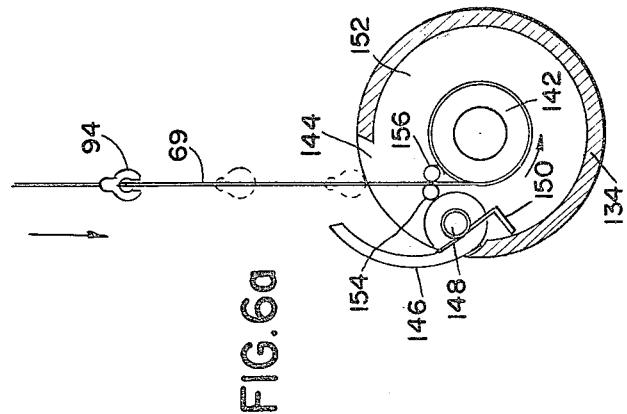
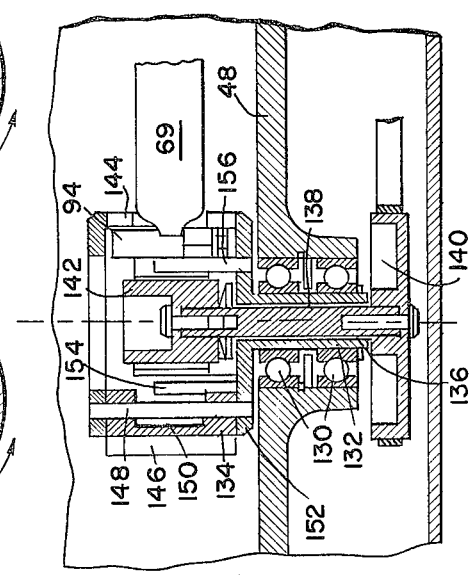

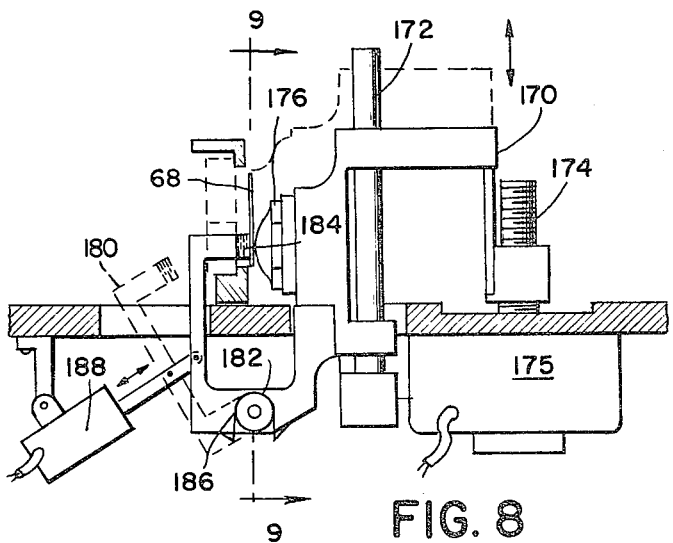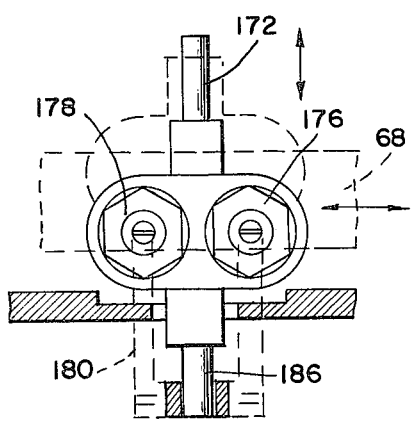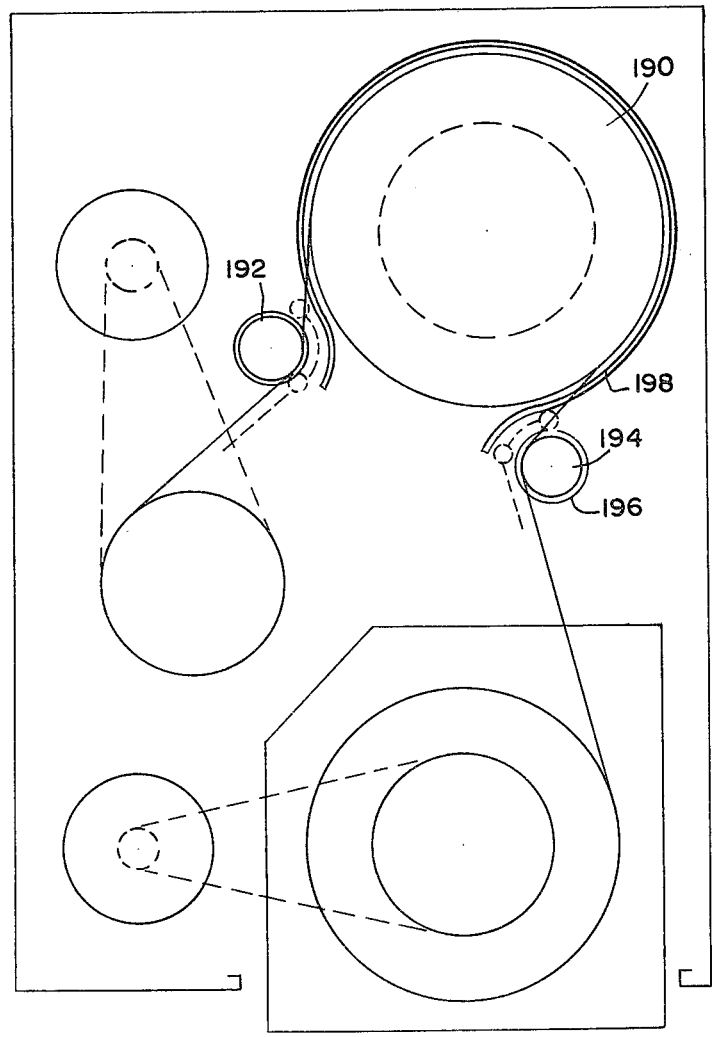

MAGNETIC DATA STORAGE AND DRIVE APPARATUS

BACKGROUND OF THE INVENTION

1. Field of the Invention

The present invention relates generally to magnetic data storage apparatus in which data is magnetically recorded on to a flexible storage medium normally stored in cassettes or cartridges, and more particularly to a novel tape cartridge and associated drive and record/playback apparatus having particular application in the storage and utilization of large quantities of digital data.

2. Description of the Prior Art

Heretofore, high density storage of digital data on a flexible medium has involved the use of both tape media stored in cartridges or cassettes, with the associated drive and record/playback mechanisms either recording (1) on tracts which run the length of the tape, normally referred to as the streaming or streamer technique, or (2) on tracts disposed at angles relative to the length of the tape, normally recorded by helical heads in a manner similar to the technique used in video recorders, or (3) on groups of short length tracts recorded on discreet lengths of the tape, normally accomplished by selectively positioning a length of tape around a rotating head such that the head records a short longitudinally directed tract each time is stopped laterally relative to the length of the tape. This technique is generally referred to as direct access recording.

Among the problems associated with prior art systems are the following: if a cassette form of tape media package is required, the cassette must be unreasonably large in order to accomodate both storage and take-up reels used in the operation thereof. If the chosen storage form is that of a single reel cartridge, there are substantial problems associated with the feeding of the loose tape end through the drive and record/playback apparatus. The primary problem associated with disk type storage formats are that the disks are obviously limited in terms of the quantity of data that can be stored on a single disk.

Another problem associated with the use of tapes as a high volume storage media is that prior art systems have required the use of expensive and frequently complex tape tensioning control mechanisms in order to maintain accurate compliance with the recording and playback heads.

Still another disadvantage of prior art tape drives is that the record and playback heads are unreasonably expensive and formed a major cost component of the drive apparatus.

SUMMARY OF THE PRESENT INVENTION

It is therefore a primary objective of the present invention to provide a new tape cartridge and associated drive and record/playback device which is relatively low in cost and overcomes the abovementioned problems associated with prior art apparatus using tape as a lower volume data storage medium.

Another object of the present invention is to provide a novel tape cartridge mechanism and associated drive apparatus having novel means for threading and driving tape stored in the cartridge.

Still another objective of the present invention is to provide a novel tape drive mechanism using a magnetic head configuration of a type such that the tension of the tape driven across the heads is of secondary importance.

Still another object of the present invention is to provide a magnetic tape drive apparatus which utilizes inexpensive record and playback heads.

Briefly, a preferred embodiment of the present invention includes a new cartridge design for containing a length of tape, the lead end of which has a ferrule member permanently attached thereto, and an associated drive apparatus which is provided with a novel leader and threading mechanism and which utilizes a pair of spherical recording heads and associated pressure pads as a means of eliminating the need for accurate tape tension control mechanisms.

The numerous advantages of the present invention will no doubt become apparent to the reader following review of the detailed disclosure made herein with reference to the several figures of the attached drawing.

IN THE DRAWING

FIG. 1 is a partially exploded perspective view showing a tape cartridge and drive apparatus in accordance with the present invention;

FIG. 2 is a perspective view further showing the cartridge and drive apparatus of FIG. 1 in operation;

FIG. 4 is a partially broken cross-sectional view taken along the line 4—4 of FIG. 3 showing details of the leader to tape connection mechanism with the cartridge inserted and disposed in the upper carrier position;

FIG. 5 is a partially broken cross-section view taken along the line 4—4 of FIG. 3 showing the leader connected to the tape and the cartridge disposed within the carrier in the lowered position;

FIGS. 6a through 6d are plan view illustrations schematically depicting operation of the novel take-up reel mechanism of the present invention;

FIG. 7 is a partially broken cross-sectional view taken along the line 7—7 of FIGS. 3 and 6b;

FIG. 8 is a partially broken cross-sectional view taken along the line 8—8 of FIG. 3;

FIG. 9 is a partially broken cross-sectional view taken along the line 9—9 of FIG. 8; and FIG. 10 is a top plan view showing an alternative embodiment of a drive apparatus in accordance with the present invention.

DETAILED DESCRIPTION OF THE PREFERRED EMBODIMENT

Figure 3:
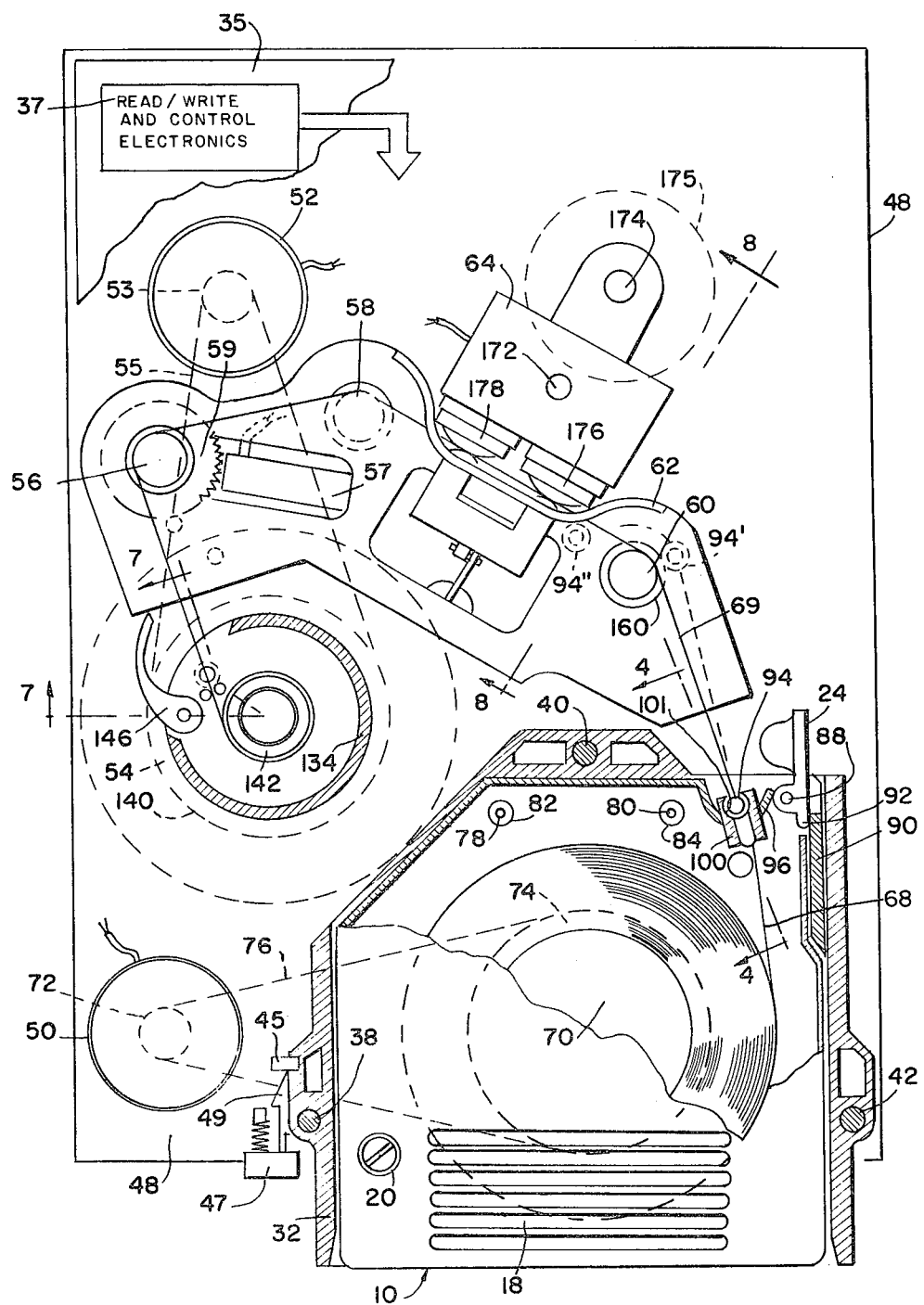
FIG. 3 is a partially broken plan view schematically illustrating the principal features of the cartridge and drive apparatus shown in FIGS. 1 and 2.

In FIG. 1 of the drawing a cartridge 10 and drive apparatus 12 in accordance with the present invention are shown with the outer housing and the electronics board partially removed from the chassis for clarity. As illustrated, the cartridge 10 has a substantially square exterior planform except that the corner 14 is removed for purposes which will be explained below. Cartridge 10 has a recess 16 provided on its front side for receiving an appropriate label/and has raised finger grips 18 provided on its top surface, with a similarly sized recess (not shown) provided in the lower surface and aligned with the area 18. The top surface also has a "safe switch" aperture provided at 20. The rear portion of the right side wall is recessed as indicated at 22 to receive a cam which opens a pivotable door disposed at the right rear corner of the cartridge at 24.

Drive 12 is contained within a chassis 25 having a front plate 26 provided with various indicators and actuators disposed on the left side thereof, as indicated at 28, and a loading aperture 30 through which a cartridge carrier 32 extends. Aperture 30 also provides clearance for allowing carrier 32 to be moved into a lowered position. Note that the carrier 32 is normally spring-loaded into the upper position illustrated and includes a recess 34 in its lower surface for facilitating removal of cartridge 10.

Referring additionally to FIG. 2 of the drawing, which shows the cartridge 10 disposed within carrier 32, with carrier 32 being moved into its lowered position, it will be noted that carrier 32 is mounted on three pins 38, 40 and 42, each of which have bumper stops 44 provided at the top thereof and each having a spring 46 disposed beneath carrier 32 to bias it upwardly into its upper position against stops 44 as illustrated in FIG. 1. Disposed above a base plate 48 and within the walls 36, are a supply spindle motor 50, a take-up reel motor 52, a take-up reel 54, a speed control idler 56, a pair of tape guides 58 and 60, a pair of leader ferrule cams 62, a dual read/write head carriage 64, and a pair of pressure pads 66. Note that the tape 68 extends from cartridge 10 around guide 60, between the read/write heads of carriage 64 and pressure pads 66, around guide 58, around speed control idler 56 and then onto pick-up reel 54.

Read/write control electronics for the apparatus is carried by one or more printed circuit board 35 as schematically illustrated at 37.

Turning now additionally to FIG. 3 of the drawing, with parts thereof being broken away for clarity, it may be seen that the supply reel 70 of cartridge 10 is driven by motor 50 via pulleys 72 and 74, a supply spindle (not shown), and a belt 76, all of which are disposed beneath the base plate 48. Note that locator pins 78 and 80, which are affixed to base plate 48, extend upwardly through corresponding locator holes 82 and 84, respectively, to properly locate cartridge 10 when carrier 32 is moved into the lowered positioned. Note also that the tape access door 24 of cartridge 10 has been pivoted about a pin 88 and into the illustrated open position by a carrier cam 90 which engages the cam follower 92 as the cartrige 10 is loaded into carrier 32. As illustrated, the leader ferrule assembly or "slug" 94, the details of which will be described below, is captured within a U-shaped pocket 96 having an integrally formed resilient capture means comprised of a pair of parallel spaced apart walls 100 having slug receiving recesses 101 formed therein, and includes a ferrule attached to tape 68 and a mating pin attached to leader 69.

In FIG. 4 of the drawing, which is a partially broken cross-section taken along line 4—4 of FIG. 3, with the carrier 32 disposed in its upper position, it can be seen that the end of tape 68 is attached at 98 to a cylindrical ferrule 93 disposed within the slug capture socket 100 shown partially broken away for clarity.

Note that the ferrule 93 is a hollow cylinder, the lower extremity of which is disposed above the lower edge of tape 68 at a distance of about one-third the width of the tape, and the upper extremity of which extends approximately the same distance above the upper edge of tape 68. A slot 102 is provided on the side of ferrule 93 opposite tape 68 to provide a passage extending into the axial cavity 104.

Disposed immediately beneath ferrule 93 is the male component, or pin member, 106 of the slug assembly. It includes a generally cylindrical base portion 108 having an outer diameter equal to that of the ferrule 93 and has an annular groove 110 formed in the outer surface near the lower end thereof. A conical recess 112 also extends axially into the lower end of base 108. Extending above the base 108 is a pointed and elongated pin 114, the outer diameter of which is slightly smaller than the inner diameter of the cavity 104 in ferrule 93. The pin member 106 is attached to the end of leader 69 at 116. Note that just as the upper end of ferrule 93 extends a predetermined distance above the top edge of tape 68, the lower end of pin member 106 extends similarly a like distance below the lower edge of leader 69.

Member 106 is shown captured within a slotted capture recepticle 118 and is held therein by the engagement of a pair of side rails 120 that forkedly engage annular grove 110. A capture detent 122 extends into the recess 112 to prevent withdrawal of the member 106 from the recepticle 118. Detent 122 is carried by a piston 124 that is normally urged upward by a spring 126. A release arm 128 extends laterally of piston 124 through a slot in the piston housing 132.

Mating of the ferrule 93 to the pin 108 is effected, as illustrated in FIG. 5, by depressing carrier 32 downwardly into its lowered position compressing the springs 46. As carrier 32 is moved into the lowered position, the pin 114 extends into cavity 104, and the end 116 of leader 69 extends into the slot 102.

Once depressed into the lowered position, carrier 32 will be latched in such position by means of a conventional latching mechanism, illustrated generally at 45, and will remain in such lower position until released by pushing a spring-loaded release button illustrated at 47, such button being coupled to a cam 49 which swings the latch 45 out of engagement with carrier 32 allowing springs 46 to return the carrier to its upper position.

It will also be observed that as cartridge 32 moves into its lowered position, the bottom of cartridge 10 engages arm 128 causing piston 124 to be lowered, thereby retracting detent 122 from engagement with the bottom of member 108. It will thus be appreciated that the slug assembly 94 now couples the leader 69 to tape 68, and since detent 122 has been released, the tape may be drawn from cartridge 10 by means of leader 69.

A similar decoupling of the leader from the tape will be automatically effected by rewinding the tape into cartridge 10 until the slug assembly is nestled within the capture recepticles 96 and 118 and the carrier latch is released allowing springs 46 to return the carrier and cartridge to the upper position illustrated in FIG. 4. This action also allows piston 124 to again move upwardly under the influence of spring 126 such that detent 122 engages the cavity 112 in the bottom of member 108 thereby locking member 108 in the capture recept101e 118. Note that the lower surfaces of the rails 120 and the upper surface 119 of the base 121 are beveled slightly to accommodate entry of member 108.

Referring now additionally to FIGS. 6a–6d and FIG. 7, which is a cross-section taken along the line 7—7 shown in FIGS. 3 and 6b, the details of the takeup reel 134 and leader take-up drum 142 will be discussed. Journaled to the base 48 (FIG. 7) by means of two sets of bearings 130 is a hollow shaft 132, the upper end of which is rigidly connected to the take-up reel 134. Extending through the center of shaft 132 and positioned axially therewithin by means of top and bottom sleeve bearings 136 is a second shaft 138, the lower extremity of which is connected to a drive pulley 140 and the upper end of which is connected to a cylindrical leader take-up drum 142.

A leader inlet opening is provided in the outer perimeter of take-up reel 134 as shown at 144 (FIG. 6a), and a door 146 is positioned to close such opening, as will be further described below. The door 146 is pivotly secured to reel 134 by means of a pin 148 and is biased into the illustrated open position by means of a spring 150. Extending upwardly from the base 152 of reel 134 are a pair of spaced apart pins 154 and 156 which serve as a means for holding reel 134 in the position illustrated in FIG. 6a as the leader 69 is unwrapped from the take-up drum 142, and conversely serve as drive pins for communicating drive energy from drum 142 to reel 134 when engaged by the slug assembly 94 after it has passed through the opening 144, as illustrated in FIG. 6b.

More particularly, when leader 69 is withdrawn from drum 142 and is, as depicted in FIG. 3, extended around idler 56 and guides 58 and 60 with the slug 94 being positioned within the capture 96, it will be appreciated that upon release of the slug 94, actuation of motor 52 will drive drum 142, via pulley 53, belt 55, pulley 140 and shaft 138 (FIG. 7), in a counterclockwise direction (FIG. 6b) so as to wind the leader onto drum 142. In so doing, the tape 68 is of course withdrawn from cartridge 10 and is threaded around guide 60, guide 58 and idler 56. During this time, door 146 is held in the open position by spring 150, and take-up reel 134 is held in a fixed position by pins 154 and 156 as they straddle leader 69. However, as soon as the slug 94 enters opening 144 and engages pins 154 and 156, as illustrated in FIG. 6b, further rotation of drum 142 will cause take-up reel 134 to be rotated along with drum 142 thereby wrapping tape 68 around drum 134 as illustrated in FIG. 6c.

As reel 134 turns through its first 360° of rotation, tape 68 will wrap around door 146 causing it to close, as illustrated in FIG. 6d. Continued application of drive will of course cause continued take-up of the tape 68 onto reel 134. However, note that both the leader and ferrule assembly 94 are now contained within the interior cavity of reel 134 and are thereby removed from interfering in any way with the take-up operation. This prevents the prior art problem known as "print through" which occurs as subsequent windings of tape are wrapped about a previous winding having a ferrule attached thereto.

As illustrated in FIG. 3 of the drawing, tape speed in any direction may be controlled in response to the readout of a capacitive of other similar type of detector 57 which senses the passage of gear teeth or other indicia provided on a wheel 59 coupled to the lower end of idler 56.

One of the problems encountered in the past in using ferrule type lead couplers relates to damage afflicted to guides, recording heads, idlers, etc., by the ferrule as it is drawn thereacross. In accordance with the present invention, such damage is prevented by providing upper and lower cam rings 160 on the guides 58 and 60, as well as on the idler 56, and upper and lower cam tracks around the recording head assembly. The rings and cam tracks are separated by slightly more than the width of the tape so the both top and bottom members will be engaged by the respective ends of slug 94. Accordingly, as the leader 69 is retracted from the position shown in FIG. 3, the slug 94 will first be engaged and be lifted away from guide 60 by cam rings 160, as indicated by the dashed lines 94', and after passing out of engagement therewith, will engage the cam tracts 62 and be lifted out of the path of the magnetic heads as illustrated by the dashed lines 94''. The same type of action will occur in passing around guide 58 and idler 56. Thus, there is no possibility of damage occurring as the ferrule assembly is threaded or retracted along the tape travel path.

In FIGS. 8 and 9, a preferred embodiment of a magnetic head assembly is depicted and includes a carriage body 170 which is driven up and down along a guide pin 172 by means of a motor driven lead screw 174. Attached to the front of body 170 are two spherical magnetic heads 176 and 178 of the type commonly used in modern floppy disk drives. In order to insure that good compliance is achieved between tape 68 and heads 176 and 178, a pair of arms 180 are pivotly secured at 182 to body 170 and carry pressure pads 184 into engagement with tape 68 causing it to be held firmly against the recording surfaces. The biasing forces applied by pads 184 are normally controlled by means of one or more springs 186 which exert appropriate biasing forces to arms 180. Retraction of the arms is effected by means of a solenoid actuator 188.

By selective actuation of the stepper motor 175, the heads 176 and 178 can be raised or lowered into alignment with any of a plurality of tracts either recorded, or to be recorded, on tape 68.

The advantages of using the standard spherical heads are several. First, they are considerably less expensive than are the magnetic heads normally used in tape drive apparatus. Additionally, since the tape speed relative to the heads is approximately the same as the relative speed of a floppy disk to its read/write heads, and since pressure pads are commonly used in disk drive devices to achieve the proper compliance between media and head, there is no need to continuously monitor and control tape tension.

Two magnetic heads, each having the same read, write and erase characteristics, are utilized in the present embodiment so that, together with appropriate electronics, a read-after-write technique can be utilized to insure that data intended to be written on the tape is in fact written. Since the heads 176 and 178 are identical, this means that by simply reversing the connections to each head, the read-after-write technique can be utilized as the tape is moved in either direction.

In FIG. 10 of the drawing an alternative embodiment of the present invention is schematically illustrated and includes components similar to those shown in FIG. 3 except that instead of using the lead screw driven "streamer" head assembly, this embodiment utilizes a rotary head 190 and operates in a "direct access" mode. The leader threading operation of this embodiment is functionally identical to that illustrated in FIG. 3 and utilizes a pair of tape guides 192 and 194, each having upper and lower ferrule cam rings 196, and a set of upper and lower cam tracks 198 which protect the rotary head 190. In this embodiment, a segment of tape is wrapped about the head 190, the tape is stopped and a plurality of tracks are read or recorded on the tape segment by incrementing head 190 up and down in accordance with direct access techniques and apparatus well-known in the art.

An important advantage of the present invention is that by utilizing a suitable fabric or other material, treated with a head cleaning substance, for the leader 69, the heads 176 and 178 will be cleaned each time a new cartridge is loaded and unloaded. This feature tends to insure that signal is not lost due to unclean magnetic head surfaces.

Another advantage of the above-described leader take-up drum and take-up reel configuration of the present invention is that a single drive motor 52 is utilized to accomplish both leader take-up and tape drive (take-up).

Although the present invention has been described above with reference to particular preferred embodiments, it is contemplated that various alterations and modifications will no doubt become apparent to those skilled in the art after having read this disclosure, it is therefore intended that the appended claims be interpreted as covering all such alterations and modifications as fall within the true spirit and scope of the invention.

What is claimed is:

1. Data storage and drive apparatus comprising:
    cartridge means containing a length of magnetic recording tape disposed upon a supply reel and having a ferrule means attached to the lead end of the tape, said cartridge means having first capture means for releaseably holding said ferrule means in a first position relative to said cartridge means; and
    drive means including
        second capture mean releaseably holding a pin means in a second position relative to said drive means,
        magnetic read/write means,
        guide means defining a tape path extending from a take-up position passed said read/write means to said second position,
        take-up means disposed at said take-up position and having a strip of leader material one end of which is attached to said take-up means and the other end of which has a ferrule engaging pin means affixed thereto, said strip being threaded around said guide means with said pin means being held in said second position by said second capture means,
        carrier means for receiving said cartridge means and carrying it between a cartridge load/unload position and a tape wind/unwind position wherein said first capture means is aligned with said second capture means such that said ferrule means is caused to engage said pin means as said carrier means is moved into said wind/unwind position thereby forming a slug means coupling said leader to said tape, and
        control means for causing said take-up means to retract said strip and to take-up the tape attached thereto by said slug means by pulling it along said tape path, and for causing data to be read from or recorded on said tape as it is drawn passed said read/write means.

2. Data storage and drive apparatus as recited in claim 1 wherein said slug means has a length in a direction transverse to the tape length that is longer than the tape width, and wherein said guide means includes cam means for camming said slug means out of said tape path as it passes said read/write means.

3. Data storage and drive apparatus as recited in claim 2 wherein said slug means has upper and lower extremities respectively extending a predetermined distance beyond each edge of said tape, and wherein said cam means includes a pair of rails disposed in front of said read/write means above and below said path and extending from one side of said read/write means to the other, said rails being engaged by said slug means as it is drawn along said path therby preventing said slug means from engaging said read/write means 4. Data storage and drive apparatus as recited in claims 1 wherein said take-up means includes a rotationally mounted outer cylinder, a rotationally mounted inner cylinder disposed concentric with said outer cylinder, said one end of said strip being attached to said inner cylinder, and means for imparting rotational energy to said inner cylinder for causing said strip to be wound thereabout, said outer cylinder having an opening provided therein through which said strip may be drawn, and stop means disposed interiorly of said opening and engageable by said slug means such that as said slug means passes through said opening and engages said stop means it causes said outer cylinder to rotate with said inner cylinder and to wind said tape thereabout.

5. Data storage and drive apparatus as recited in claim 4 wherein said outer cylinder has a closure means pivotally mounted thereto for closing said opening and means normally biasing said closure means into an open position, said closure means being closed by said tape as the first wrap of said tape about said outer cylinder is completed.

6. Data storage and drive apparatus as recited in claim 1 wherein said strip of leader material is coated with head cleaning material such that each time said strip is drawn passed said read/write means it cleans the heads thereof.

7. Data storage and drive apparatus as recited in claim 1 wherein said read/write means includes a pair of spherical read/write heads disposed in side-by-side relationship along said path.

8. Data storage and drive apparatus as recited in claim 7 wherein said read/write means includes means for incrementally raising and lowering said heads relative to said tape path such that a plurality of data tracks may be read or recorded on said tape.

9. Data storage and drive apparatus as recited in claim 7 wherein read/write means includes pressure pad means disposed in facing relationship to said read/write heads, said pad means being operative to urge said tape into engagement with said heads with a predetermined force.

10. Data storage and drive apparatus as recited in claim 1 wherein said read/write means includes rotary head means operative to engage said tape in a direct access mode.

* * * * *